United States Patent [19]
Latini et al.

[11] Patent Number: 5,495,418
[45] Date of Patent: Feb. 27, 1996

[54] AUTOMATIC PANNING SYSTEM

[75] Inventors: Leo Latini, Oak Brook; Dennis Plegge, Arlington Heights, both of Ill.

[73] Assignee: Latini Machine Company, Elmhurst, Ill.

[21] Appl. No.: 78,113

[22] Filed: Jun. 18, 1993

[51] Int. Cl.[6] .......................... G06F 15/00; B05B 15/00
[52] U.S. Cl. .................. 364/468; 364/469; 118/20; 118/19; 118/666; 427/2.18
[58] Field of Search .................... 364/468, 469; 113/19, 20; 118/666; 427/2.18

[56] References Cited

U.S. PATENT DOCUMENTS

| | | | |
|---|---|---|---|
| 3,451,375 | 6/1969 | Martin | 118/19 |
| 4,168,674 | 9/1979 | Futter | 118/695 |
| 4,514,093 | 4/1985 | Coch et al. | 366/138 |
| 4,554,887 | 11/1985 | Yoakam et al. | 118/666 |
| 4,576,108 | 3/1986 | Socola et al. | 118/19 |
| 4,586,457 | 5/1986 | Qunajtschik | 118/19 |
| 4,639,383 | 1/1987 | Casey | 427/213 |
| 4,658,754 | 4/1987 | Messner et al. | 118/303 |
| 4,688,514 | 8/1987 | Yamabayashi et al. | 118/64 |
| 4,725,446 | 2/1988 | Forster et al. | 427/3 |
| 4,736,304 | 4/1988 | Doehler | 364/469 |
| 4,799,449 | 1/1989 | Miyata et al. | 118/19 |
| 4,817,006 | 3/1989 | Lewis | 364/476 |
| 5,010,838 | 4/1991 | Simelunas et al. | 118/19 |
| 5,100,683 | 3/1992 | Singer et al. | 426/302 |

Primary Examiner—Paul P. Gordon
Attorney, Agent, or Firm—Patula & Associates

[57] ABSTRACT

An apparatus for coating a plurality of centers with coating material is disclosed. The apparatus comprises a rotatable drum supported within a housing by a drive assembly. A spray arm assembly connected to a plumbing system is mounted within the drum to supply the coating material to the centers. An air flow system is provided to the drum to aid in the coating process. The coating process can be performed under hot or cold conditions and involves the repeated coating and drying of the centers until the desired product is obtained.

31 Claims, 4 Drawing Sheets

AUTOMATIC PANNING SYSTEM

This invention relates generally to a machine for producing coatings or shells on a mass of centers, and more particularly, an automatic panning system for producing sugar coatings or shells on a tumbling mass of centers.

BACKGROUND OF THE INVENTION

Panning is a complex confectionery or pharmaceutical operation which until recently was more of an art than a science. Simply stated, panning is the repetitive crystallization of sucrose or other sugar or syrup-like coating on a tumbling mass of centers. Thin crystal layers build upon each other to form the resulting shell or coating. The coating syrup can be applied hot for centers capable of withstanding elevated temperatures, i.e., jawbreakers, or cold for centers, i.e., chocolate or chewing gum. Coating solutions can be prepared by simply dissolving sucrose in water and using a refractometer to measure the percentage of solids concentration or brix.

The selection of syrup temperature and concentration is determined by the desired product quality and thickness of the coating. For example, if the center will not readily melt, and the coating is relatively thick, a high concentration of 75–85% at 140° F. (60° C.) can be used. Syrup solids will range from 85% concentration for hot panning applications to 65% concentration for finish coatings. Normal syrup solids and application temperatures are 75–77% at 140° F./60° C. for hot panning, 69–72% at 80°/27° C. for cold panning, and 65–67% at 80° F./27° C. for finishing. The higher the concentration, the faster the drying time and the larger the crystals. Conversely, a lower solids concentration, as in finishing syrup, results in increased drying time and smaller, finer crystals.

Hard sugar panning is a somewhat slow and tedious process because only one thin coat of crystals can be applied at a time, and each coat must be thoroughly dried before the following application is applied. Too quick of an application will cause coating failure and processing problems. Production times can be reduced somewhat by using higher concentration syrups during initial coating processes and then gradually reducing the syrup concentration so that the finished surface is coated with small fine crystals. Care must be taken though in early coatings so as not to create a "rough" center that is impossible to finish to a smooth shell. For high quality products, patience is required and the process is inevitably slow.

After finishing, the product is normally stored in trays overnight in a conditioned storage area for drying prior to polishing. This is not always required and the length of drying time will depend upon the syrup application rate and concentration of solids.

Polishing is usually accomplished in a ribbed pan by the application of dry or liquid carnauba/bee's wax blends. For additional product protection, confectioner's glazes can also be applied to the waxed pieces. Normally, confectioner's glazed products should be "aired" in well ventilated trays for 18–24 hours prior to packaging to allow any solvents to evaporate.

As can be seen from the above description, panning can be a long, expensive, tedious and imperfect process. With the availability of high technology sensors, monitors and other technologies, the "art" or "feel" of traditional confectionery panning can now be eliminated.

One attempt to do so can be found in U.S. Pat. No. 4,639,383 issued to Casey. Casey discloses a method and apparatus for coating particulate granules. The method is practiced by providing a fluidized charge of granules suspended in a flow of a drying gas within a rotating perforated coating pan. The coating material is dispersed onto the moving granules suspended in the flow of drying gas. The use of panning techniques involving suspending the granules in a fluidized bed produced by a current of air, may be desirable to speed the drying of the individual granules, but such techniques present their own problems.

For example, the suspension of the granules creates vigorous agitation of the granules since they are in constant movement in the air flow. Such vigorous agitation increases collisions between granules, resulting in damage to the product and excessive dust formation within the pan. Also, in the use of such techniques as in Casey, coating material is wasted as some of it is inevitably lost in the exhaust of the flow of drying gas. Further, the dispersion of drying gas or air during the coating operation can dry the product too fast, not allowing the product to become adequately or evenly saturated. Additionally, the plumbing requirements for such systems often require complicated plumbing structures and configuration.

The present invention solves the problems of conventional panning techniques as well as the problems in fluidizing techniques such as Casey. The invention provides a relatively fast, controlled, and efficient panning process by the repetition of separate spray, distribution, and drying cycles.

BRIEF SUMMARY OF THE INVENTION

The present invention comprises a rotatable drum in which a tumbling mass of centers are coated with a solution to form a desired shell. The coating process consists of the repetition of separate spraying, distribution, and drying cycles. A spray arm is located in the center of the drum to coat the centers during the spray cycle. An air flow system is provided to produce a drying air flow through the drum during the drying cycle. Control means are provided to monitor and control the condition of the air, the drum speed, and the cycle times.

Accordingly, it is the principle object of the present invention to provide a method and apparatus for hot and cold panning.

It is a further object of the invention to provide an efficient and economic method and apparatus for coating a mass of centers.

It is also an object of the invention to provide for the controlled movement of conditioned air through the drum during panning.

It is an additional object of the invention to provide a method and apparatus for panning which minimizes waste, product damage, and dust formation during the panning process.

It is another object of the invention to provide a method and apparatus for panning utilizing an improved three cycle panning process.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT OF THE PRESENT INVENTION

While the invention is susceptible of embodiment in many different forms, there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

FIGS. 1–8 illustrate generally the present invention 10 comprising a rotatable drum 20, a spray arm assembly 40, an air flow system 60, drive assembly 120, and control means 180.

Figure 1:
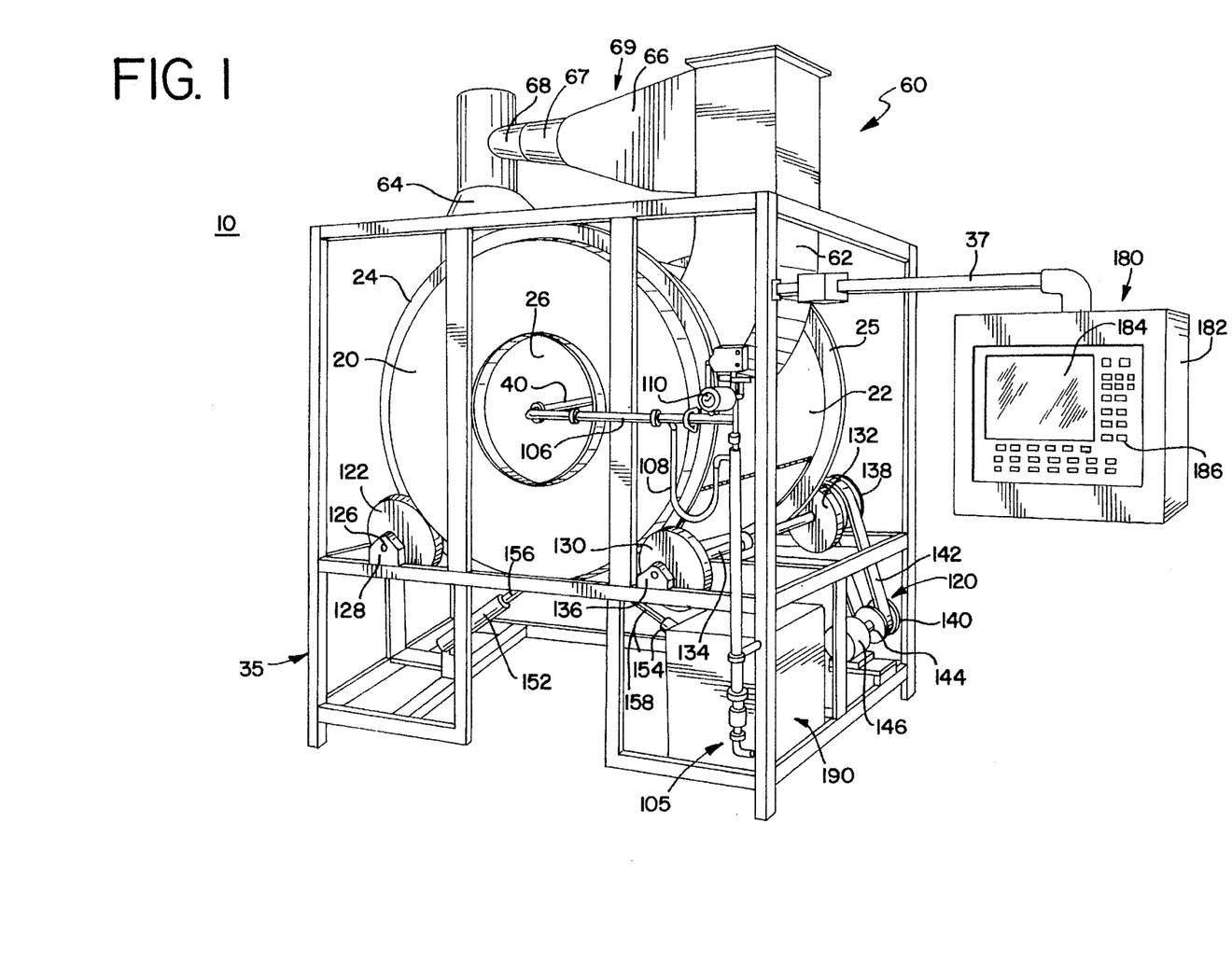
FIG. 1 is a perspective view of the preferred embodiment of the present invention.

FIG. 1 shows the present invention 10 with rotatable panning drum 20 supported in a housing structure 35. Drum 20 sits in cylindrical drum housing 22 and is rotatably supported therewithin. Drum 20 includes drum flanges 24 and 25 and front opening 26. Extending inside drum 20 is spray arm assembly 40. Spray arm assembly 40 is suitably connected to a plumbing system 105 which supplies the coating material to spray arm assembly 40. Plumbing system 105 includes a number of interconnected pipes 106 and hoses 108 and includes a pressure gauge 110.

Attached to one side of drum housing 22, at an upper portion thereof, is an inlet duct 62 of air flow system 60. Attached to the opposite side of drum housing 22, at a lower portion thereof, is an outlet or exhaust duct 64. Inlet duct 62 and exhaust duct 64 are further interconnected by a series of collars 66, 67, and 68 which form a by-pass duct 69 for selected air flow around drum 20.

Mounted to housing structure 35 via a post 37 is a computerized control means 180. Control means 180 is housed in an enclosure 182 and includes a monitor 184 and input keys 186.

Drum 20 is rotated by drive assembly 120. Drum 20 rests upon and is supported by a plurality of wheels. On the exhaust side of drum housing 22, a pair of idler wheels 122, 124 (not shown) contact and support opposite ends of drum 20 extending a short distance out from drum housing 22. Idler wheels 122, 124 are connected by an idler shaft 126 which is supported in shaft mounts 128, 129 (not shown), which in turn are mounted to housing structure 35 at opposite ends thereof. Idler shaft 126 is preferably two separate shafts, each supporting one idler wheel to provide extra support to the drum.

On the inlet side of drum housing 22, a pair of drive wheels 130, 132 contact and support opposite ends of drum 20. Drive wheels 130, 132 are connected by a drive shaft 134 which is mounted to housing structure 35 at opposite ends thereof. Drive shaft 134 is aligned evenly and parallel with idler shaft 126.

Adjacent to drive wheel 132, a gear belt pulley 138 is mounted on shaft 134. Pulley 138 is connected to a second gear belt pulley 140 via a gear belt 142. Pulley 140 is mounted to a motor shaft 144 of eurodrive gear motor 146 mounted in housing structure 35.

Also seen in FIG. 1 are air cylinders 152, 154 and pistons 156, 158 for operation of a discharged door 160 (not shown), located under drum 20 in a drum housing 22. A water tank assembly 190 is further shown mounted in housing structure 35.

Figure 2:
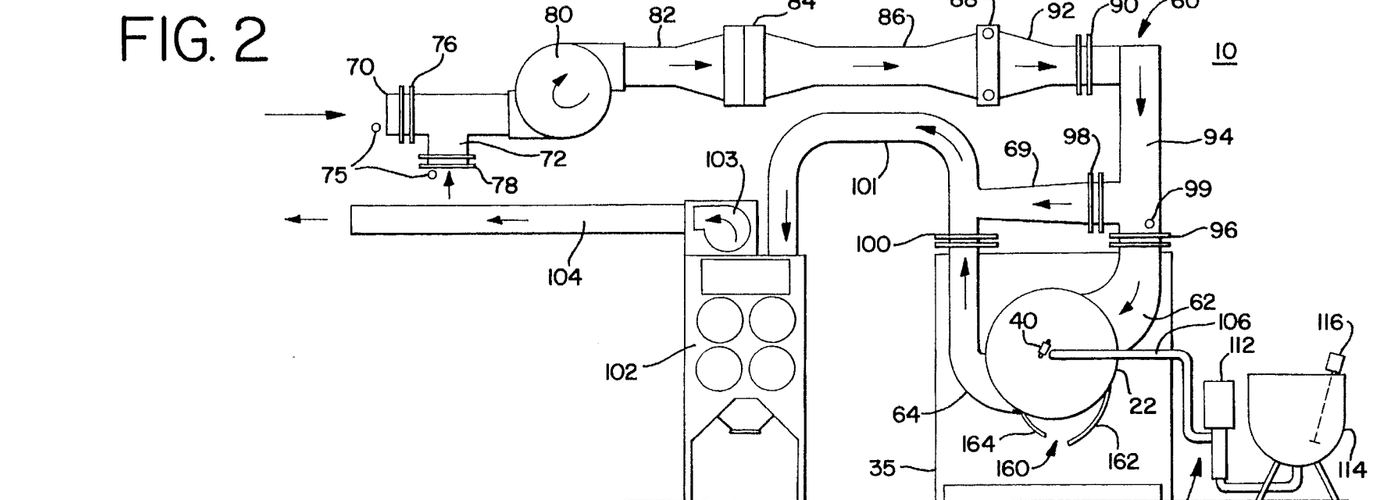
FIG. 2 is a schematic view of the present invention.

FIG. 2 shows a schematic view of invention 10 and air flow system 60. Drum housing 22 is shown inside housing structure 35. Spray arm assembly 40 extends inside the rotatable drum and connects to pipes 106 of plumbing system 105. Pipes 106 connect to a sugar pump 112, operatively connected to a kettle 114. Kettle 114 holds the coating material to be sprayed by spray arm assembly 40. An agitator 116 is placed in kettle 114 to agitate the coating material. Discharge door 160 is further shown in FIG. 2. Discharge door 160 comprises a right half 162 and a left half 164.

As seen in FIG. 2, air for the panning process can enter the air flow system 60 from an outside air intake duct 70 or a plant air intake duct 72. Temperature/humidity sensors 75 are located just outside of ducts 70 and 72 to allow an operator to select what type of air, outside or plant, is best on any given day. Air control dampers 76 and 78, opened and closed either manually or by rotary actuators, are located in ducts 70 and 72 respectively, to provide proper flow of air in the system 60. A blower 80 draws air from either duct 70 or duct 72 and delivers the air to drum 20. Blower 80 is preferably a three horse-power variable speed blower capable of delivering 2,400 C.F.M. of air to drum 20.

Blower 80 blows air through a first duct 82 to an air conditioning coil 84 where the air is cooled. The air then moves through a second duct 86 to a steam coil heater 88 which reheats the air in order to de-humidify the air as much as possible. The air continues to flow past an air flow monitor 90 in a third duct 92 and into a vertical duct 94. Air in vertical duct 94 flows into either inlet duct 62 or by-pass duct 69 depending on whether air control dampers 96 and 98 are opened or closed. Air control dampers 96 and 98 are located in inlet duct 62 and by-pass duct 69 respectively, and are selectively opened and closed by rotary actuators. Inlet duct 62 has a temperature/humidity sensor 99 located just above damper 96. Sensor 99 operates a steam valve to control the temperature of the air to be delivered to drum 20.

Outlet duct 64 also contains an air control damper 100 opened and closed by a rotary actuator. Air flow continues in the direction of the arrows in FIG. 2. Air exiting either by-pass duct 69 or outlet duct 64 enters first exit duct 101 which leads to a dust collector 102. Dust collector 102 removes any dust from the panning process which may escape into the air. A second blower 103 then blows the dust-free air into a second exit duct 104 and outside the plant.

Figure 3:
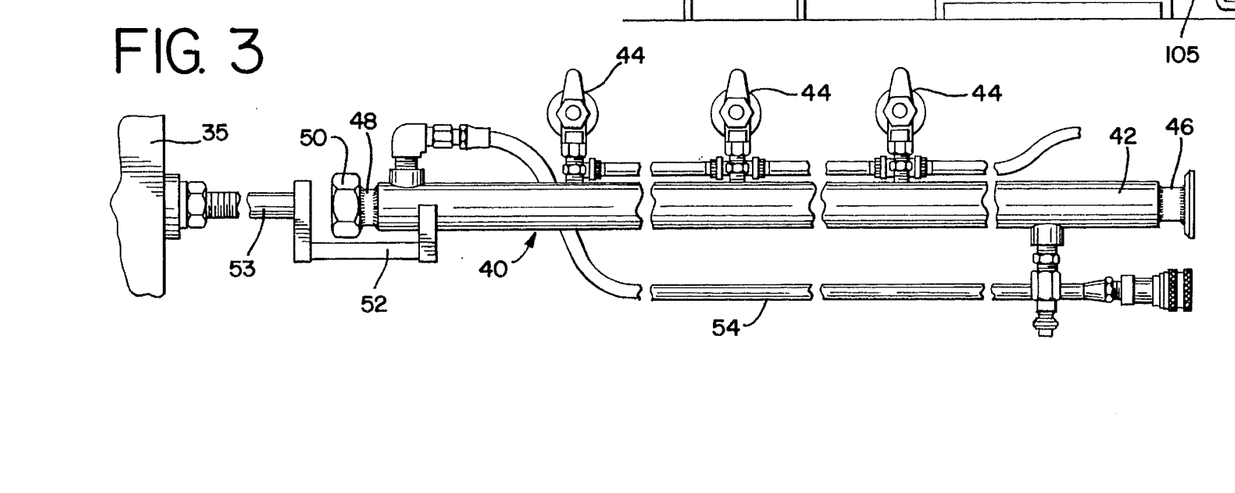
FIG. 3 is a front view of the spray arm of the present invention.

FIG. 3 is a broken view of the spray arm assembly 40 of the present invention 10. As can be seen, spray arm assembly 40 includes a spray bar 42 and a plurality of spray guns 44 operatively connected to spray bar 42. Spray bar 42 comprises a first end 46 which attaches to pipes 106 of plumbing system 105. Spray bar 42 further comprises a second end 48 having a cap 50 thereon. Second end 48 of spray bar 42 rests on a spray bar support 52. Support 52 is mounted to housing structure 35 via a shaft 53 extending through a back opening of drum 20 to provide proper support to spray bar 42. Spray arm assembly 40 further includes hose assembly 54.

Figure 4:
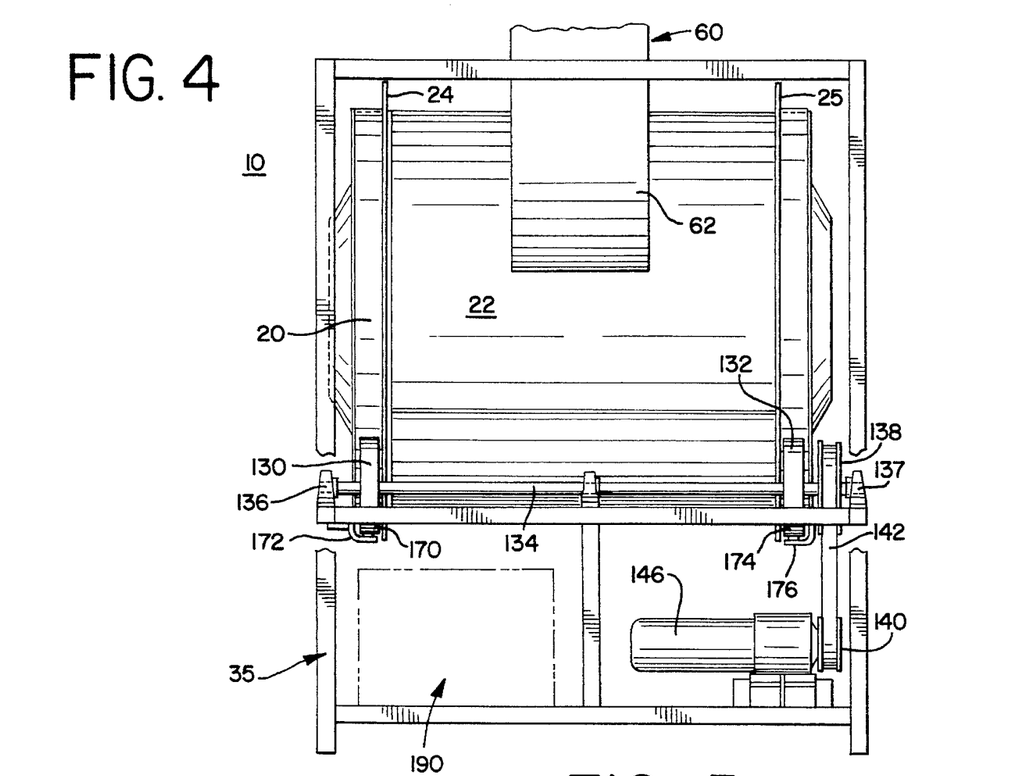
FIG. 4 is a side view of the present invention.

FIG. 4 is a side view of invention 10. Drum 20 is supported inside drum housing 22 by drive wheels 130, 132 and idler wheels 122, 124 (not shown). Inlet duct 62 of air flow system 60 is connected to one side of drum housing 22 in an upper portion thereof. Also seen in drum housing 22 is right half 162 of discharge door 160. Drive wheels 130, 132 are mounted on drive shaft 132. Shaft 132 is mounted in shaft mounts 136, 137 securely fastened to housing structure 35. A pulley 138 is mounted on shaft 132. Pulley 138 is operatively connected to another pulley 140 by a belt 142. Pulley 140 is mounted on a shaft of a motor 146. A water tank assembly 190 is mounted in housing structure 35.

As seen in FIG. 4, invention 10 further comprises a plurality of limit wheels 170, 174. Front limit wheel 170 is suitably mounted in a wheel mount 172. Wheel mount 172 is securely fastened to housing structure 35. Limit wheel 170 establishes rolling contact with drum flange 24 and together with a back limit wheel 174 establishing rolling contact with drum flange 25, prevent drum 20 from moving axially. Back limit wheel 174 is suitably mounted in a wheel mount 176 which is securely fastened to housing structure 35.

Figure 5:
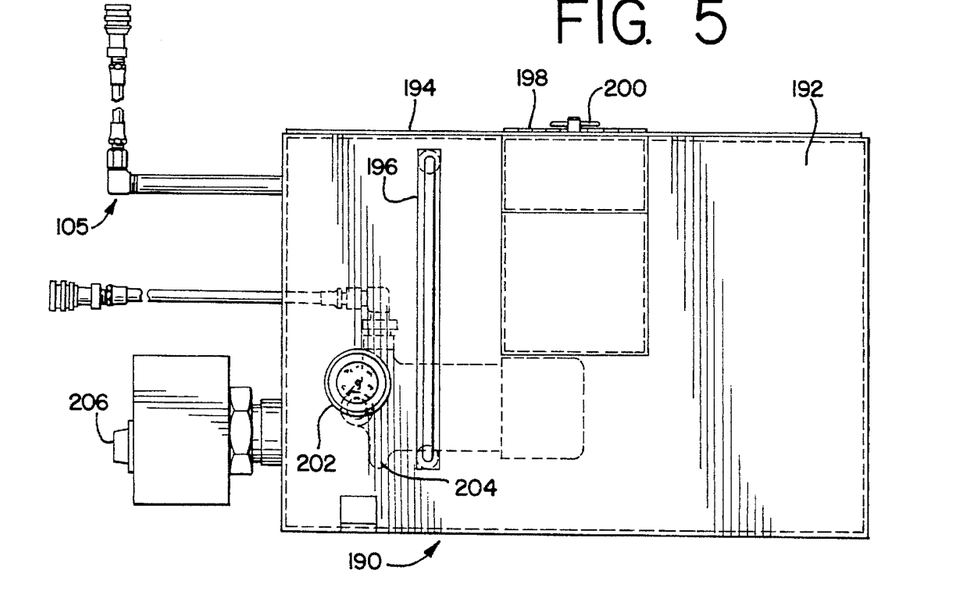
FIG. 5 is a side view of the water tank assembly of the present invention.

FIG. 5 illustrates water tank assembly 190. Water tank assembly 190 includes a hot water tank 192 having a tank cover 194, a liquid level gauge 196, and a hinged filler cover 198 with a latch 200. A thermometer 202 is located on the side of water tank assembly 190. On the side of tank 192 is located a hot water pump 204. An immersion heater 206 is operatively connected to tank 192. Tank 192 is further operatively connected to plumbing system 105.

Figures 6, 7, 8:
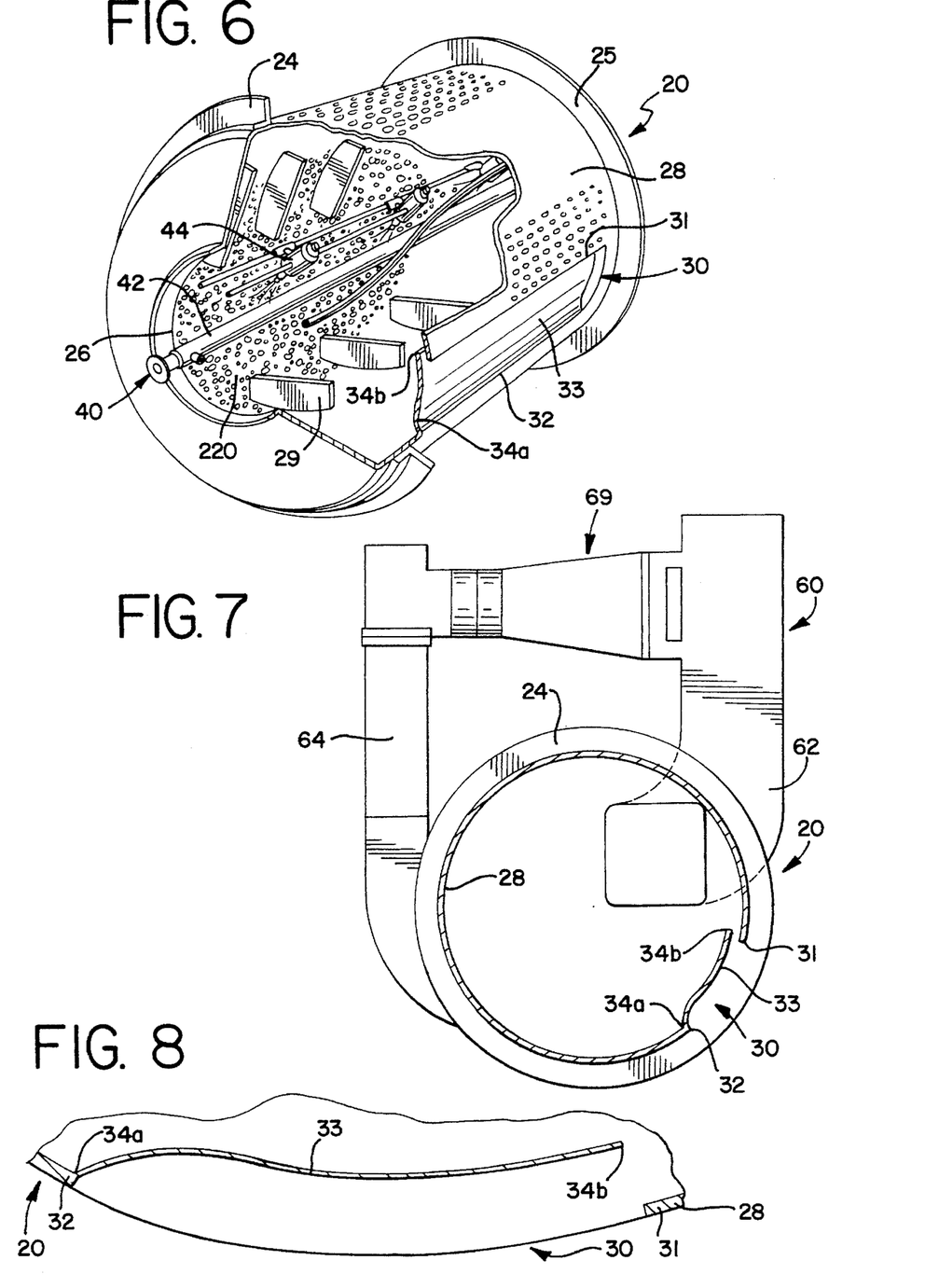
FIG. 6 is a perspective view of the drum of the present invention with a section of the drum partially broken away.
FIG. 7 is a front view of the drum and air ducts of an alternate embodiment of the present invention.
FIG. 8 is a broken away cross-sectional view of the drum and clam shell of the present invention.

FIG. 6 is a partially broken away view of the rotatable drum 20 of invention 10. Drum 20 having drum flanges 24, 25 and front opening 26 further includes a perforated cylindrical drum surface 28. Attached to the inside of drum surface 28 are a plurality of baffles 29 to aid in the mixing and coating of the centers 220 to be coated during the panning process. Spray arm assembly 40 with spray bar 42 and spray guns 44 is shown mounted inside rotatable drum 20.

Further shown in FIG. 6, drum surface 28 of drum 20 contains a longitudinal opening 30 defined by drum surface ends 31 and 32. Partially covering opening 30 in drum 20 is a clam shell 33. Clam shell 33 has a first end 34a and a second end 34b and is mounted inside drum 20. First end 34a is mounted to or in contact with drum surface end 32 such that none of the centers 220 can pass therebetween. Clam shell 33 extends over opening 30 and gradually rises above drum surface 28. As a result, second end 34b is positioned a short distance above drum surface end 31, thereby providing an opening for the centers 220 to reach opening 30 and exit drum 20 (as will be described in more detail below).

FIG. 7 shows an alternate embodiment of the present invention showing inlet duct 62 mounted in back of drum 20, rather than on the side. Outlet duct 64 and by-pass duct 69 remain substantially in the same location; however, outlet duct 64 is never in use in this embodiment and need not be encorporated therewith. The back positioning of inlet duct 62 is desirable for coating a mass of centers with chocolate. Due to the relative thickness of a chocolate coating syrup, drum surface 28 is preferably solid rather than perforated. Therefore, air cannot flow through the side of the drum. Drying air thus enters the back of drum 20 through inlet duct 62 and exits drum 20 through front opening 26. Since the chocolate coating does not produce dust particles, the air flow need not be directed to dust collector 102. As can be seen, solid drum surface 28 has an opening 30 defined by ends 31 and 32. End 34a of clam shell 33 is mounted to or in contact with end 32. Clam shell 33 extends over opening 30 such that end 34b is positioned slightly above end 31 of drum surface 28.

FIG. 8 shows clam shell 33 mounted in drum 20 above opening 30. Opening 30 is defined by ends 31 and 32 of drum surface 28. Clam shell end 34a is mounted to or in contact with end 32 of drum surface 28. Clam shell 33 extends over opening 30, gradually curving upward and then leveling off to follow the curvature of drum surface 28, such that end 34b of clam shell 33 is positioned a small distance above drum surface end 31. Centers moving in a direction from end 32 to end 31 would ride up onto and along clam shell 33 over opening 30 and fall back onto drum surface 28, thereby avoiding opening 30. Centers moving in a direction from end 31 to end 32, however, would pass under clam shell end 34b to opening 30 to exit drum 20.

The present invention can be sized to desired production amounts. For example, it is foreseen that the drum 20 can hold a 250 kilo (500 lbs.) batch size or a 500 kilo (1000 lbs.) batch size. Spray guns 44 contain self-cleaning spray heads. The spray arm assembly 40 can contain any suitable number of spray guns. Preferably, three spray guns are used in a 250 kilo batch size drum and six spray guns are used in a 500 kilo batch size drum.

The invention 10 is of a sanitary construction. The drum 20 and all contact parts are preferably made of stainless steel. The computerized control means 180 are user friendly and utilize changeable batch programs with large operator's control screens. A suitable steam coil is provided and sized to match the batch size with a computer controlled steam valve for accurate air temperature control. The air flow is monitored for humidity, temperature and velocity.

The dust collector 102 of invention 10 is installed on the exhaust side of the system. Dust collector 102 preferably is capable of drawing 2400+ C.F.M. of air from the pan. By delivering approximately 2000 C.F.M. of drying air to the inlet, while drawing 2400 C.F.M. from the pan outlet, a negative pressure is maintained within the pan. This negative pressure is important to extract excessive sugar dust from within the pan and to draw the conditioned drying air through the product bed.

In operation, the panning process comprises a repetition of three cycles: a spray cycle, a distribution cycle, and a dry cycle.

To begin the automatic panning process, a mass of centers 220 are loaded into rotatable drum 20 through front opening 26. The operator can now begin the first spray cycle. The operator selects the appropriate air, and air control dampers 76 and 78 are opened or closed accordingly. Blower 80 blows air through air flow system 60. During the spray cycle, air control dampers 96 and 100 are closed and damper 98 is open such that air flows through by-pass duct 69. No air is delivered to the drum 20 during the spray cycle as this would dry the product too quickly not allowing the centers to be adequately saturated.

Motor 146 of drive assembly 120 rotates drum 20 clockwise via pulleys 138, 140, belt 142, and drive wheels 130, 132. As the drum 20 rotates, the mass of centers 220 begin to tumble therein. Spray guns 44 of spray arm assembly 40 then begin to coat the tumbling mass of centers 220. Centers 220 ride over clam shell 33 and are thus prevented from exiting drum 20 through opening 30.

The length of the coating solution spray time can be programmed by the operator at the computer control means. Since the product load grows from cycle to cycle, there is an increase in the surface area to be coated. As the product grows, the spray time (dosage) increases. Therefore, a beginning spray time and an ending spray time can be programmed.

The operator further has a choice of either continuous spray or pulsating spray (e.g., one second spray/one second off). There are several advantages in the use of the pulse spray mode. The invention 10 relies on high pump pressure of preferably 300–600 P.S.I. not only for solution atomization, but also to eliminate the possibility of clogged spray tips. The pulse spray cycle allows the spray tip orifice size to be doubled, compared to a continuous spray of equal spray time, and still apply the same dosage of coating syrup. The high pump pressure, the shock of the pulsation spray mode, and the larger spray tip orifice effectively eliminate the possibility of clogged spray tips. Furthermore, the pulsation spray mode allows for longer spray times eliminating flooding of the product. As a result, the mass of centers are better saturated and evenly distributed, especially on short spray cycles of 5–10 seconds for example.

As described above, the invention 10 utilizes pump pressure rather than air for the atomization of the solution. With air atomization systems, over a short period of time (three hours or so), a buildup of sugar crystals on the spray tip (bearding) would greatly effect the spray pattern. The bearding would become so excessive that the spray guns would have a tendency to spit rather than spray. Also, the excessive air turbulence generated within the drum would begin to dry the coating before the solution was adequately distributed. Excessive sugar dust is created and compressed air requirements are extremely high in an air atomization system. Further, the plumbing requirements in an airless system are much less complicated.

Following the spray cycle, the machine goes into a distribution (dwell) cycle. During this cycle, drum 20 continues to rotate and the mass of centers are allowed to tumble for a period of time in order to fully saturate and distribute the solution amongst the individual centers. The length of the distribution cycle can also be programmed at the operator's monitor. While in the distribution cycle, the spray guns 44 are off and the air flow is the same as in the spray cycle. No air is delivered to the pan. Baffles 29 assist in mixing the mass of centers to aid in saturation and distribution.

After the mass of centers 220 become fully saturated, the invention advances to the dry cycle. Air control damper 98 is closed and damper 96 is opened. As a result, the air flow for drying purposes is diverted into inlet duct 62 and is forced into the rotating drum 20. At the same time, damper 100 is opened to allow the drying air to flow through drum 20 and into outlet duct 64 and duct 101 to dust collector 102.

As with the spray cycle, as the product grows, there is more surface area to adequately dry before returning to the spray cycle. Therefore, a beginning dry time and an ending dry time is programmed at the control means 180. Air from the dust collector 102 is blown by blower 103 through duct 104 and into the outside atmosphere.

After completion of the dry cycle, damper 96 and 100 are closed and damper 98 is opened. The machine then returns to repeat the spray cycle. The number of cycles to be programmed depends on the manufacturer's desired shell or coating thickness. Beginning and ending times for all cycles (spray, distribution and dry) are scaled up or down based on programming times.

When the product is finished as desired, the clam shell 33 of drum 20 stops in a three o'clock position. At this time discharge door 160 is opened. Air cylinders 152 and 154 actuate pistons 156 and 158 to open left half 164 and right half 162 of discharge door 160, respectively, which are hinged to drum housing 22. With discharge door in an opened position, drum 20 is rotated alternately counter-clockwise and clockwise between a four o'clock and an eight o'clock position of the clam shell 33. As the drum 20 rotates counter-clockwise, a plurality of centers are forced under clam shell 33 and fall through opening or drum exit 30. The drum 20 is rotated in this manner until substantially all of the coated centers exit drum 20. The centers falling through drum exit or opening 30 fall into a collection bin, or alternatively, fall onto a conveyor system which moves the centers to a packaging station. Once the drum has been unloaded, the discharge door 160 is shut and the machine is ready to coat another batch of centers.

It is to be understood that the embodiments herein described are merely illustrative of the principles of the present invention. Various modifications may be made by those skilled in the art without departing from the spirit or scope of the claims which follow.

We claim:

1. A mechanism for coating a mass of centers, comprising:
   a drum rotatably supported about an axis of rotation for receiving said mass of centers;
   means for rotating said drum;
   means for coating said mass of centers;
   an inlet structure for selectively directing a processed gas into said drum;
   an outlet structure for allowing said processed gas to leave said drum;
   first gas processing means for producing cooled gas;
   second gas processing means for heating said cooled gas, said second processing means being in fluid communication with said first processing means; and
   control means for selectively operating and monitoring said mechanism.

2. The mechanism of claim 1, wherein said first gas processing means includes an air conditioning coil and said second gas processing means includes a steam coil heater.

3. The mechanism of claim 2, wherein said processed gas is de-humidified air.

4. A method for producing a shell coating on a mass of centers, comprising the steps of:
   (f) placing said mass of centers in a drum rotatably mounted in a drum housing having an air inlet duct mounted therein;
   (g) closing an air control damper in said air inlet duct to prevent air from flowing through said drum;
   (h) rotating said drum to tumble said mass of centers;
   (i) spraying said mass of centers with a coating solution from a spray bar having spray guns extending longitudinally into said drum through a front opening thereof;
   (j) distributing said coating material to saturate individual pieces of said mass of centers by allowing the centers to tumble for a period of time after spraying;

(k) opening said air control damper in said air inlet duct to allow a flow of air through said drum;

(l) drying said coating solution on said mass of centers by allowing the centers to tumble in said flow of air for a period of time;

(m) repeating steps (b) through (g) a predetermined number of times to produce a finished product; and (n) stopping rotation of said drum.

5. The method as claimed in claim 4, wherein said drum comprises a drum surface having a longitudinal opening defined by a first drum surface end and a second drum surface end, and a clam shell substantially covering said longitudinal opening, having a first edge and a second edge, said first edge contacting said first drum surface end and said second edge raised slightly above said second drum surface end, said rotation of said drum being stopped with the clam shell at approximately a nine o'clock position.

6. The method as claimed in claim 5, wherein said drum housing comprises a discharge door at a bottom portion thereof.

7. The method as claimed in claim 6, further comprising the steps of:

opening said discharge door in said drum housing;

alternatingly rotating said drum between approximately a eight o'clock position and a four o'clock position such that said mass of centers pass under said second edge of said clam shell to said longitudinal opening; and discharging said mass of centers through said longitudinal opening and said discharge door.

8. An apparatus for coating a plurality of centers, comprising:

a drum rotatably supported inside a drum housing for receiving said plurality of centers;

a plurality of wheels in rolling contact with and supporting said drum, said plurality of wheels mounted on a plurality of shafts supported by a housing structure;

a drive assembly operatively associated with said plurality of wheels on said plurality of shafts to provide rotational movement to said drum;

a spray arm assembly extending into said drum through a front opening thereof, said spray arm assembly operatively connected to a plumbing system for supplying a coating solution to said plurality of centers;

an air flow system for supplying drying air to said plurality of centers in said drum; and computer control means for selectively operating and monitoring said apparatus.

9. The apparatus of claim 8, wherein said drum comprises a perforated drum surface, a radial flange at each end of said drum, a plurality of baffles on an inside surface of said drum, and a longitudinal opening in said drum surface for providing an exit for said plurality of centers.

10. The apparatus of claim 9, wherein said longitudinal opening in said drum surface is substantially covered by a clam shell affixed to said drum surface at one longitudinal end of said longitudinal opening.

11. The apparatus of claim 9, wherein said apparatus further includes a plurality of limit wheels mounted to said housing structure and in rolling contact with said radial flanges of said drum, said plurality of limit wheels prevent said drum from moving axially in said drum housing.

12. The apparatus of claim 9, wherein said air flow system includes a plurality of air ducts, a plurality of air control dampers, at least one blower, a dust collector, temperature/humidity sensors, an air flow monitor, an air conditioning coil, and a steam coil heater.

13. The apparatus of claim 12, wherein said plurality of air ducts includes an inlet duct mounted in one side of said drum housing for delivering drying air to said drum through said perforated surface, and an outlet duct mounted in an opposite side of said drum housing for exhausting said drying air from said drum through said perforated surface.

14. The apparatus of claim 8, wherein said spray arm assembly comprises a spray bar having a first end and a second end, and a plurality of spray guns, said first end operatively connected to said plumbing system, and said second end resting on a support bracket mounted to said housing structure.

15. The apparatus of claim 8, wherein said drum housing includes a hinged discharge door having a right half and a left half, said discharge door operable by piston rods in air cylinders.

16. The apparatus of claim 8, wherein said drum comprises a front and back opening, a solid drum surface having a plurality of baffles mounted therein, and a longitudinal opening in said drum surface.

17. The apparatus of claim 16, wherein said air flow system includes an air inlet duct mounted in back of said drum for directing a flow of air through said back opening and out said front opening of said drum.

18. An automatic panning system comprising:

a housing structure;

a drum housing mounted in said housing structure;

a drum rotatably supported in said drum housing for receiving a mass of centers, said drum comprising a first end, a second end, a drum surface, and a front opening at said first end, said first end and said second end extend outside said drum housing;

a pair of idler wheels in rolling contact with and supporting said drum in said drum housing;

a pair of drive wheels in driving contact with and supporting said drum in said drum housing;

a spray bar having spray guns extending through said front opening and into said drum, said spray bar in fluid communication with a plumbing system for supplying a coating material to said mass of centers;

an air inlet duct and an air outlet duct mounted in said housing structure allowing a flow of air through said drum; and a computerized control means for selectively operating and monitoring said system.

19. The system of claim 18, wherein said drum further comprises radial flanges, one at each of said first end and said second end.

20. The system of claim 19, wherein a plurality of limit wheels mounted to said housing structure are in rolling contact with said radial flanges of said drum and prevent said drum from moving laterally in said drum housing.

21. The system of claim 18, wherein said drum further comprises:

a longitudinal opening in said drum surface defined by a first drum surface end and a second drum surface end; and a rectangular clam shell having a first edge and a second edge, said shell mounted in said drum and extending over said longitudinal opening, said first edge contacting said drum surface at said first drum surface end, and said second edge raised slightly above said second drum surface end.

22. The system of claim 18, wherein said drum housing includes a discharge area.

23. The system of claim 22, wherein said discharge area comprises a hinged door having left and right halves openable and closeable by piston rods in air cylinders.

24. The system of claim 18, wherein said plumbing system includes piping, a sugar pump, a kettle and an agitator.

25. The system of claim 18, wherein said inlet duct and said outlet duct include air dampers mounted therein for selectively controlling said flow of air through said drum.

26. A method for coating a plurality of centers, comprising the sequential steps of:

(a) tumbling said plurality of centers in a rotating drum;

(b) spraying said plurality of centers with a coating solution from spray guns on a spray bar extending into said rotating drum, in the absence of air flow through said drum;

(c) distributing said coating solution amongst individual pieces of said plurality of centers by continuing to rotate said drum for a period of time after spraying;

(d) downwardly directing a flow of drying air through said rotating drum at approximately a thirty degree angle to the horizon to dry the distributed coating solution on said plurality of centers;

(e) repeating steps (a) through (d) a predetermined number of times to obtain a finished product.

27. The method as claimed in claim 26, wherein the drum rotates in a drum housing having a discharge door, said drum including a longitudinal opening partially covered by a clam shell.

28. The method as claimed in claim 27, further comprising the steps of:

opening said discharge door in said drum housing;

reversing rotation of said drum to allow said plurality of centers to pass under said clam shell to said longitudinal opening;

unloading said plurality of centers through said longitudinal opening and out said discharge door.

29. The method as claimed in claim 27, wherein said flow of drying air is directed through a perforated surface of said drum from an air inlet duct mounted in one side of the drum housing and exits said drum through an air outlet duct mounted in an opposite side of the drum housing.

30. The method as claimed in claim 26, wherein said flow of drying air is directed through a back opening of said rotating drum from an air inlet duct mounted at a back end of said drum and exits said drum through a front opening in said drum.

31. The method as claimed in claim 30, wherein said drum comprises a solid drum surface having a longitudinal opening therein.

* * * * *